US011354637B2

(12) United States Patent
Ramachandran et al.

(10) Patent No.: US 11,354,637 B2
(45) Date of Patent: Jun. 7, 2022

(54) METHODS AND SYSTEMS FOR PERFORMING A FINANCIAL TRANSACTION USING A MOBILE COMMUNICATION DEVICE

(75) Inventors: Renjith Ramachandran, Cincinnati, OH (US); Erwin Catindig, West Covina, CA (US); Naeem Rana, Cincinnati, OH (US); Lakshmi Maddala Ragavendra Swamy, Maineville, OH (US); Jason Orn, Cincinnati, OH (US)

(73) Assignee: CITICORP CREDIT SERVICES, INC. (USA), Sioux Falls, SD (US)

( * ) Notice: Subject to any disclaimer, the term of this patent is extended or adjusted under 35 U.S.C. 154(b) by 0 days.

(21) Appl. No.: 13/414,995

(22) Filed: Mar. 8, 2012

(65) Prior Publication Data
US 2013/0238497 A1   Sep. 12, 2013

(51) Int. Cl.
| G06Q 20/18 | (2012.01) |
| G06Q 20/36 | (2012.01) |
| G06Q 20/32 | (2012.01) |
| G06Q 20/40 | (2012.01) |
| G06Q 20/38 | (2012.01) |

(52) U.S. Cl.
CPC ......... G06Q 20/18 (2013.01); G06Q 20/3278 (2013.01); G06Q 20/36 (2013.01); G06Q 20/385 (2013.01); G06Q 20/40 (2013.01)

(58) Field of Classification Search
USPC ........................................................ 705/41
See application file for complete search history.

(56) References Cited

U.S. PATENT DOCUMENTS

| 4,660,168 A * | 4/1987 | Grant et al. ................. 705/7.12 |
| 7,577,613 B2 * | 8/2009 | Tramontane ....... G06Q 20/0453 705/43 |
| 2005/0177522 A1 * | 8/2005 | Williams ................ G06F 21/31 705/72 |

(Continued)

FOREIGN PATENT DOCUMENTS

| EP | 0745961 A2 | 12/1996 |
| EP | 1160744 A2 | 12/2001 |
| EP | 1489535 A1 | 12/2004 |

OTHER PUBLICATIONS

Marsan et al. (Institute of Electrical and Electronics Engineers Inc., "Performance models of handover protocols and buffering policies in mobile wireless ATM networks", Sep. 12, 2001, pp. 925-941).*

(Continued)

*Primary Examiner* — Gregory A Pollock
(74) *Attorney, Agent, or Firm* — Johnson, Marcou, Isaacs & Nix, LLC; George Marcou; Scott A. Hendrix

(57) ABSTRACT

Methods and systems for performing a pre-staged financial transaction using a computing device involve, for example, receiving, using a self-service transaction terminal processor, pre-staged transaction data in a session at the self-service financial transaction terminal, which pre-staged transaction data was entered on a mobile computing device at a time preceding a time of the session. Thereafter, using the self-service transaction terminal processor, a transaction is executed, based at least in part on the pre-staged transaction data.

22 Claims, 3 Drawing Sheets

(56) References Cited

U.S. PATENT DOCUMENTS

| | | | | |
|---|---|---|---|---|
| 2007/0125840 | A1* | 6/2007 | Law | G06Q 20/10 |
| | | | | 235/379 |
| 2007/0265984 | A1* | 11/2007 | Santhana | 705/65 |
| 2008/0040273 | A1* | 2/2008 | Savage et al. | 705/43 |
| 2011/0016047 | A1 | 1/2011 | Wu et al. | |
| 2011/0113245 | A1 | 5/2011 | Varadarajan et al. | |
| 2011/0238573 | A1 | 9/2011 | Varadarajan et al. | |
| 2011/0246316 | A1 | 10/2011 | Cincera et al. | |
| 2012/0197797 | A1* | 8/2012 | Grigg | G06Q 20/1085 |
| | | | | 705/43 |
| 2013/0048714 | A1* | 2/2013 | Sharma | G06Q 20/346 |
| | | | | 235/379 |
| 2013/0226794 | A1* | 8/2013 | Englebardt | 705/43 |

OTHER PUBLICATIONS

International Search Report and Written Opinion dated Jan. 4, 2013 for counterpart International Patent Application No. PCT/US12/69640, pp. 1-11.

Fourth Written Opinion for Singapore Patent Application No. 11201403819Q, dated Mar. 17, 2017, 5.

Second Chinese Office Action for Chinese Patent Application No. 201280071131.8, dated Apr. 6, 2017, 19.

Second Mexican Office Action for Mexican Patent Application No. MX/a/2014/010699, dated Apr. 9, 2017, 7.

Second Examiner's Report for Australian Patent Application No. 2012372778, dated Jun. 26, 2017, 3.

Australian Examiner's Report for Australian Patent Application No. 2012372778, dated May 9, 2017, 3.

Second Written Opinion for Singapore Patent Application No. 11201403819Q, dated Jan. 15, 2016, 5.

Mexican Office Action for Mexican Patent Application No. MX/a/2014/010699 (English-language translation summary ncluded), dated Oct. 17, 2016, 7.

Office Action for Chinese Patent Application No. 201280071131.8, dated Nov. 17, 2016, 19.

Singapore Search Report and Written Opinion for co-pending Singapore Patent Application No. 11201403819Q, dated Jul. 3, 2015, 2.

Third Written Opinion for Singapore Patent Application No. 11201403819Q, dated Aug. 22, 2016, 5.

Final Office Action for Chinese Patent Application No. 201280071131.8, dated Oct. 17, 2017, 8.

Examination Report for Singapore Patent Application No. 11201403819Q, dated Dec. 14, 2017, 5.

Third Mexican Office Action for Mexican Patent Application No. MX/a/2014/010699, dated Dec. 26, 2017, 11.

Fourth Mexican Office Action for Mexican Patent Application No. MX/a/2014/010699, dated May 21, 2018, 12.

Final Rejection for Mexican Patent Application No. MX/a/2014/010699, dated Jan. 16, 2019, 14 pages (includes English-language summary).

* cited by examiner

METHODS AND SYSTEMS FOR PERFORMING A FINANCIAL TRANSACTION USING A MOBILE COMMUNICATION DEVICE

FIELD OF THE INVENTION

The present invention relates generally to the field of financial transactions, and more particularly to methods and systems for performing a pre-staged financial transaction with a self-service financial transaction terminal using a mobile computing device, such as a mobile communication device.

BACKGROUND OF THE INVENTION

Currently available self-service financial transaction channels include mobile devices, such as smart phones equipped with digital wallets and self-service financial transaction terminals, such as automated teller machines (ATMs). Mobile devices and ATMs have both overlapping functions and very distinctively different functions. For example, an ATM is primarily a cash-dispensing machine, as well as a check or a cash-accepting machine. On the other hand, digital wallets provide a convenient way to store an individual's credentials and account information.

There is a present need for methods and systems that bring together currently available self-service channels to provide increased convenience and greater security in performing financial transactions by enabling a financial institution customer to start or create a transaction on the customer's mobile device, which the customer may ultimately execute in terms of the ATM.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform the methods and systems for performing a pre-staged financial transaction with a self-service financial transaction terminal using a mobile computing device, such as a mobile communication device, described herein. Embodiments of the invention provide methods and systems for performing a pre-staged financial transaction using a mobile computing device that involves, for example, receiving, using a self-service financial transaction terminal processor, pre-staged transaction data in a session at the self-service financial transaction terminal, which pre-staged transaction data was entered on a mobile computing device at a time preceding a time of the session. Likewise using the self-service financial transaction terminal processor, a transaction is executed based at least in part on the pre-staged transaction data.

In aspects of embodiments of the invention, receiving the pre-staged transaction data which was entered on the mobile computing device at the preceding time may involve, for example, receiving pre-staged transaction data which was entered on an application of the mobile computing device at the preceding time. In addition, receiving the pre-staged transaction data which was entered on the mobile computing device at the preceding time may involve, for example, receiving pre-staged transaction data which was entered on a digital wallet application of the mobile computing device at the preceding time. In other aspects of embodiments of the invention, receiving the pre-staged transaction data which was entered on the mobile computing device at the preceding time may involve, for example, receiving pre-staged transaction data which was entered on a digital wallet application of a mobile communication device at the preceding time. Receiving the pre-staged transaction data which was entered on the mobile computing device at the preceding time may also involve, for example, receiving a digital wallet application PIN which was entered on a digital wallet application of the mobile computing device at the preceding time.

In further aspects of embodiments of the invention, receiving the pre-staged transaction data which was entered on the mobile computing device at the preceding time may involve, for example, receiving a selection of a transaction card account for the transaction which was entered on the digital wallet application at the preceding time. Additionally, receiving the pre-staged transaction data which was entered on the mobile computing device at the preceding time may involve, for example, receiving a selection of a transaction type which was entered on the digital wallet application at the preceding time. Receiving the pre-staged transaction data which was entered on the mobile computing device at the preceding time may also involve, for example, receiving a transaction amount which was entered on the digital wallet application at the preceding time. Receiving the pre-staged transaction data which was entered on the mobile computing device at the preceding time may further involve, for example, receiving a self-service financial transaction terminal PIN which was entered on the digital wallet application at the preceding time In additional aspects of embodiments of the invention, receiving the pre-staged transaction data at the self-service financial transaction terminal may further involve, for example, receiving the pre-staged transaction data at the self-service financial transaction terminal via a contactless communication interface. Receiving the pre-staged transaction data via the contactless communication interface may also involve, for example, receiving the pre-staged transaction data at the self-service financial transaction terminal via a contactless communication device associated with the mobile computing device. In addition, receiving the pre-staged transaction data via the contactless communication interface may involve, for example, receiving the pre-staged transaction data at the self-service financial transaction terminal via an activated contactless communication device associated with the mobile computing device.

In still further aspects of embodiments of the invention, receiving the pre-staged transaction data via the activated contactless communication device may involve, for example, receiving the pre-staged transaction data via the activated contactless communication device securely transmitting the transaction data. Receiving the pre-staged transaction data via the activated contactless communication device may additionally involve, for example, receiving the pre-staged transaction data via the activated contactless communication device within a pre-determined timeout period. Receiving the pre-staged transaction data via the activated contactless communication device may further involve, for example, receiving the pre-staged transaction data via the contactless communication device which is activated to interact with the processor of the self-service financial transaction terminal when the contactless communication device is in proximity to a contactless communication reader associated with the self-service financial transaction terminal In additional aspects of embodiments of the invention, receiving the pre-staged transaction data via the activated contactless communication device may involve receiving the pre-staged transaction data via a near field communication device which is activated to interact with the processor of the self-service financial transaction terminal when the near field communication device is in proximity to a near field communication reader associated with the self-service financial transaction terminal. In other aspects, receiving the pre-staged transaction data at the self-service financial transaction terminal may involve receiving the pre-staged transaction data at the self-service financial transaction terminal via a physical connection communication interface.

In other aspects of embodiments of the invention, executing the transaction may involve, for example, executing the transaction based at least in part on the pre-staged transaction data which was received from the mobile computing device via a contactless communication device associated with the mobile computing device. Executing the transaction based at least in part on the pre-staged transaction data which was received from the mobile computing device via the contactless communication device may also involve, for example, executing the transaction based at least in part on the pre-staged transaction data which was received from the mobile computing device via a contactless communication reader associated with the self-service financial transaction terminal. Executing the transaction may further involve, for example, validating the transaction data by the self-service financial transaction terminal processor.

In still other aspects of embodiments of the invention, executing the transaction may involve, for example, sending the validated transaction data from the self-service financial transaction terminal to a host processor for authorization. Executing the transaction may also involve, for example, sending a message authorizing the transaction from the host processor to the self-service financial transaction terminal. Executing the transaction may additionally involve, for example, dispensing a transaction amount from the self-service financial transaction terminal. Executing the transaction may also involve, for example, transmitting a receipt for the transaction from the self-service financial transaction terminal to the mobile computing device.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Figure 1:
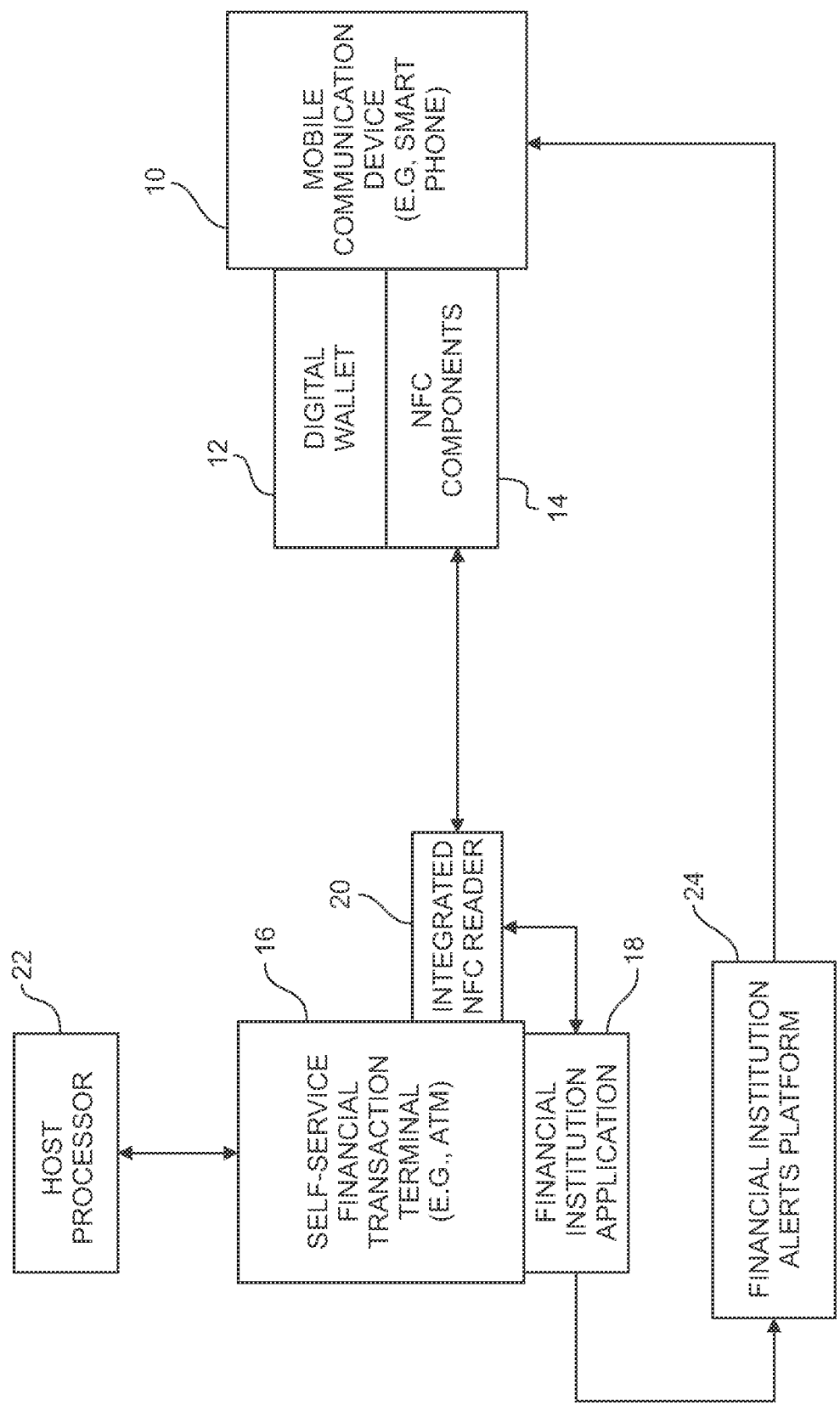
FIG. 1 is a schematic diagram that illustrates an overview example of key components and the flow of information between key components for methods and systems for performing a pre-staged financial transaction using a mobile communication device with a self-service financial transaction terminal for embodiments of the invention.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention utilize, for example, a digital wallet application on a processor of a mobile device, such as a smart phone, for pre-staging an ATM transaction to provide a contactless ATM transaction without any physical interaction with the ATM. An aspect of embodiments of the invention focuses on the customer experience by providing customers an alternative channel using a mobile device, such as smart phone, to pre-stage an ATM transaction and to complete the execution of the transaction at the ATM. This increases the security of the transaction since it is staged in private and improves the speed of execution by significantly reducing the length of transaction time for the customer in front of the ATM to create the transaction. While the examples used herein may relate at least in part to ATMs and ATM terminals and ATM transactions, it is to be understood that these are examples only and that embodiments of the invention are not limited to ATMs or ATM terminals or ATM transactions but include any and all types of self-service transaction terminals and any and all types of self-service transactions. It is to be further understood that use of the terms "ATM" and "ATM terminal" herein includes self-service transaction terminals and self-service financial transaction terminals of all types.

Another aspect of embodiments of the invention focuses on the customer experience by providing the ability for customers to execute an ATM transaction without any direct physical contact with the ATM terminal other than, for example, to retrieve or deposit cash or checks. This further increases the security of the transaction by protecting against skimming (i.e., theft of transaction card information) since the transaction is pre-staged in private by the customer and likewise improves the speed of execution by reducing the transaction time for the customer in front of the ATM. Thus, according to embodiments of the invention, it is only necessary for the customer to remain at the ATM for the short period of time required for the ATM to dispense or accept cash or to perform some other function that is explicit to the ATM.

Embodiments of the invention make advantageous use of the overlapping capabilities of a customer's mobile device, such as a smart phone, and ATMs to improve security, privacy and convenience for customers in performing ATM transactions. Embodiments of the invention may employ two-way contactless communication between the customer's mobile device, such as a mobile phone, and a self-service transaction terminal, such as an ATM. Near Field Communication (NFC), which is a type of contactless communication capability that allows data exchange and wireless connections between two devices in close proximity to each other. Embodiments of the invention may involve, for example, a digital wallet application on a processor of a customer's NFC-enabled mobile device. It is to be understood that while various examples herein may refer to contactless communication, such as NFC contactless communication, between a customer's mobile device and a self-service transaction terminal, embodiments of the invention are not limited to NFC contactless communication but include all types of contactless or wireless communication between the customer's mobile device and the self-service transaction terminal, including, without limitation, Radio Frequency Identification (RFID), Bluetooth, and Wi-Fi types of contactless or wireless communication. It is also to be understood that embodiments to the invention are not limited to contactless communication but also include all types of physical contact communication between the customer's mobile device and the self-service transaction terminal, including, without limitation, wire-based, fiber-optic-based, or waveguide-based communication, or any combinations thereof.

Currently, many mobile devices, such as smartphones, are provided with embedded NFC chips that can send data over short distances to an NFC reader. Embodiments of the invention may utilize such NFC capabilities to provide an interface between a customer's mobile device and an ATM, which enables direct two-way communication between the mobile device processor and the ATM processor. Using such direct NFC communication between the customer's mobile device and an ATM, an ATM transaction may be performed conveniently, securely and privately any time the customer's NFC-enabled mobile device is in proximity to an ATM with an NFC reader.

FIG. 1 is a schematic diagram that illustrates an overview example of key components and the flow of information between key components for methods and systems for performing a pre-staged financial transaction using a mobile communication device with a self-service financial transaction terminal for embodiments of the invention. Referring to FIG. 1, embodiments of the invention may employ a mobile communication device 10, such as a smart phone with a smart phone processor, on which may be deployed a digital wallet application 12 and which may be equipped with a contactless communication-enabled mobile communication device 14, such as a near field communication-enabled smart phone. Referring further to FIG. 1, embodiments of the invention may also employ a self-service financial transaction terminal 16, such as an ATM with an ATM processor, on which may be deployed a financial institution application 18 and which may be equipped with an integrated contactless communication-enabled reader 20, such as a near field communication-enabled reader. The self-service financial transaction terminal 16 may be coupled, for example, over a network to a backend or host processor 22 and may also communicate with the mobile communication device 10 via a financial institution alerts platform 24.

Figure 2:
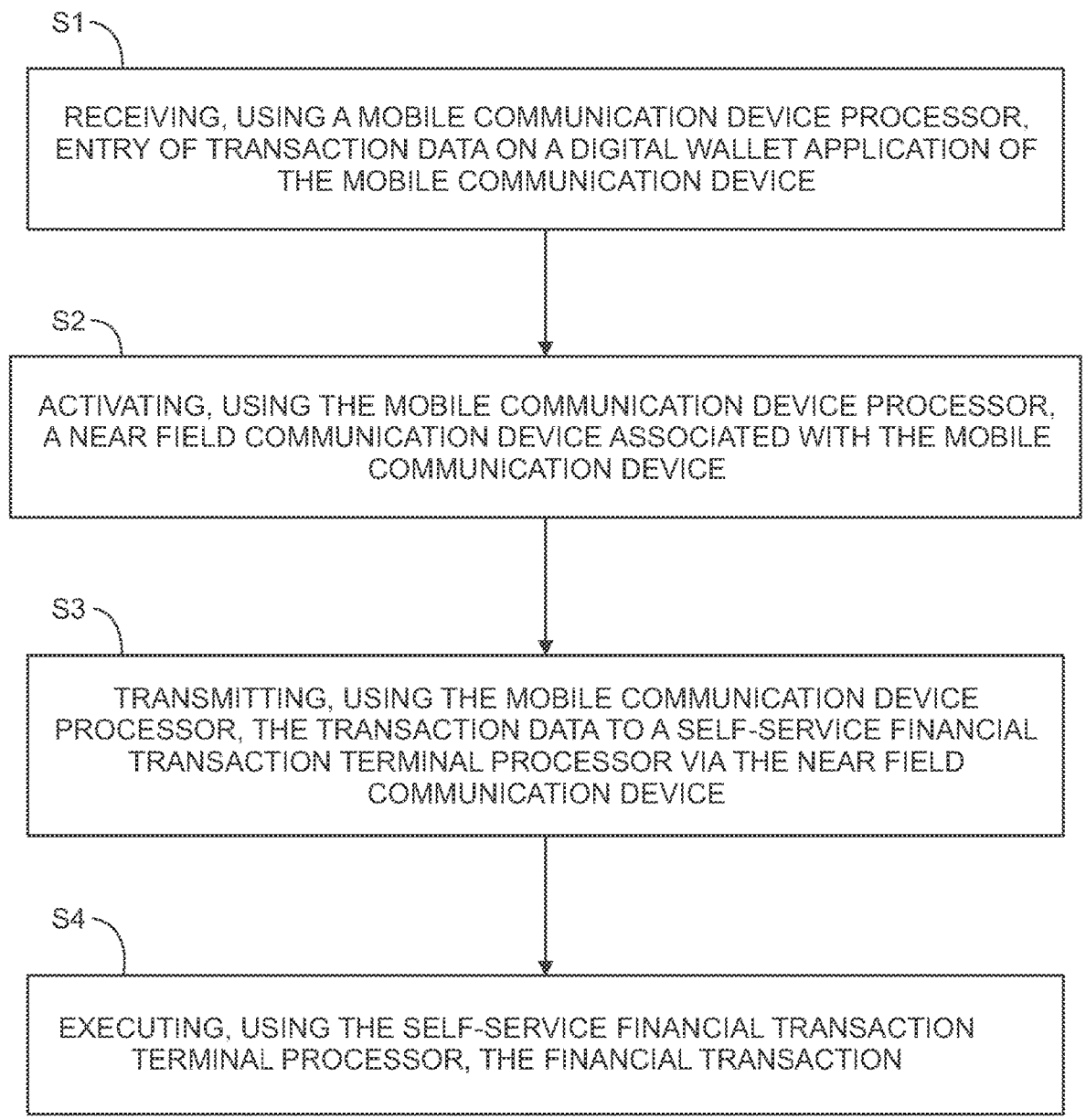
FIG. 2 is a flow chart which illustrates an overview example of the process of performing a pre-staged financial transaction using a mobile communication device with a self-service financial transaction terminal for embodiments of the invention.

FIG. 2 is a flow chart which illustrates an overview example of the process of performing a pre-staged financial transaction using a mobile communication device, such as a near field-enabled smart phone, with a contactless communication-enabled self-service financial transaction terminal, such as a near field-enabled ATM, for embodiments of the invention. Referring to FIG. 2, at S1, using a processor of the mobile communication device 10, entry of transaction data may be received on a digital wallet application 12 of the mobile communication device 10, and at S2, a near field communication device 14 associated with the mobile communication device 10 may be activated, likewise using the processor of the mobile communication device 10. At S3, also using the processor of the mobile communication device 10, the transaction data may be transmitted to a processor of a self-service financial transaction terminal 16 via the near field communication device 14 of the mobile communication device 10 and the integrated near field communication 20 of the self-service financial transaction terminal 16. At S4, the financial transaction may be executed, using the processor of the self-service financial transaction terminal 16.

The process of a customer's ATM withdrawal according to embodiments of the invention may involve, for example, deploying an application 12 on the processor of the customer's mobile device 10 that, when activated, may prompt the customer for a selection of an ATM transaction. Upon selecting a transaction, such as an ATM cash withdrawal transaction, the customer may complete the transaction by approaching an ATM 16 and waving his or her NFC-enabled mobile device 10 near, or tapping his or her mobile device 10 on, the NFC reader 20 of the ATM 16. The customer's cash withdrawal transaction selection may be communicated by the digital wallet application 12 on the processor of the customer's NFC-enabled mobile device 10 to the processor of the ATM 16 which may execute the transaction and may immediately dispense the cash to the customer. Thereafter, instead of dispensing a physical transaction receipt to the customer, the processor of the ATM 16 may track the customer, who may instead be provided with a receipt on his mobile device via an alerts platform 24 e-mail or short message service (SMS) so it may not necessary for the customer to carry a paper receipt around. While a cash withdrawal transaction is used in the forgoing example, it is to be understood that embodiments of the invention include any and all types of transactions, financial or otherwise, that may be performed using any type of transaction terminal While a significant advantage of embodiments of the invention is elimination of a need for the customer to carry his or her transaction token or card, such as an ATM card, at all times, an even more important advantages is the convenience and speed with which ATM transactions can be accomplished. Further, embodiments of the invention minimize security and fraud issues, such as compromise or theft of ATM cards and PINs. Moreover, data transmissions between the customer's mobile device and the ATM are encrypted.

At a platform layer, embodiments of the invention may employ an ATM 16 with a financial institution ATM application 18 running on an ATM processor. In addition, the ATM 16 may be provided with an integrated NFC reader 20. Embodiments of the invention may also employ at the platform level a digital wallet 12 on a processor of the customer's mobile device 10 which may host a financial institution mobile application. The mobile application enables a customer to pre-stage or perform a financial transaction before he or she approaches a self-service transaction terminal, such as an ATM 16. A software layer on the ATM 16 may communicate with back-end or host processors 22 of the financial institution to which it may be coupled over a network, for example, and an alerts platform 24 to send SMS and e-mail messages back to the customer.

Existing art self-service financial transaction terminals, such as conventional ATMs, are computerized machines equipped with card readers and PIN pads. Using a physical ATM card, such as a magnetic stripe card, and a PIN, a customer may access his or her accounts and perform financial transactions via an existing art ATM. In embodiments of the invention, in addition to a card reader and PIN pad, the ATM 16 may be provided with an integrated contactless card reader, such as a NFC card reader 20, that can read contactless communication-enabled mobile devices, such as NFC-enabled smart phones. The contactless communication-enabled card reader, such as the NFC card reader 20, of the ATM 16 for embodiments of the invention is different from existing art ATM card readers through which a cardholder swipes his or her magnetic stripe card in order for the card reader to read magnetically recorded data on the card. In embodiments of the invention, the NFC reader 20 of the ATM 16 is capable of transacting with NFC-enabled mobile devices, such as smart phones. The contactless communication-enabled card reader, such as the NFC reader 20, of the ATM 16 for embodiments of the invention not only reads card data but also performs transactions.

The contactless communication-enabled mobile device 10 for embodiments of the invention may be a mobile device such as a mobile phone, that is equipped with an NFC component 14, such as an NFC chip, embedded into the phone, for example, in an external sleeve depending on the type and model of the mobile device. Many vendors are currently beginning to provide NFC chip-embedded mobile phones, and it is expected that others will follow suit. At an application layer on the mobile device 10 for embodiments of the invention, the financial institution application may interact with the NFC chip to cause the NFC chip to transmit data to the NFC reader 20 of the ATM 16 or to receive and review data from the processor of the ATM 16. Further, the financial institution application on the mobile device 10 may be capable of instructing the NFC chip on the mobile device 10 to interact with the ATM processor when it comes into proximity to the NFC reader 20 of the ATM 16. The application on the mobile device 10 for embodiments of the invention may employ specific types of data and transaction commands to assure and enable communication between the mobile application and the ATM processor and the secure exchange of data.

The hardware layer for embodiments of the invention may be used, for example, to facilitate secure transmission and transactions, and the actual processing and business logic may be on the application layer on both the mobile device 10 and the contactless communication-enabled self-service transaction terminal, such as ATM 16. On the ATM side, the financial institution ATM application may instruct and work in conjunction with the NFC reader 20 on the ATM 16. On the mobile device side, the financial institution mobile application may instruct and work in conjunction with the NFC chip on the mobile device 10.

The mobile device wallet application 12 may store customer ID and transaction card data, such as credit, debit, and ATM card numbers and PINS. The mobile device wallet application 12 may perform an authorization and authentication process with the financial institution's back-end or host processor 22 to assure, for example, that the mobile device data is synchronized with the customer data. For example, the authorization and authentication process may not permit a customer to load another party's transaction card data onto the customer's digital wallet application.

As noted above, the pre-staged transaction for embodiments of the invention may involve, for example, three major components. These three components may include, for example, a customer's contactless communication-enabled mobile device, such as his or her NFC-enabled mobile device 10, a financial institution's contactless communication-enabled self-service transaction terminal, such as a NFC-enabled ATM 16, and a back-end or host system 22 of the financial institution to which the NFC-enabled ATM 16 may be coupled over a network.

Figure 3:
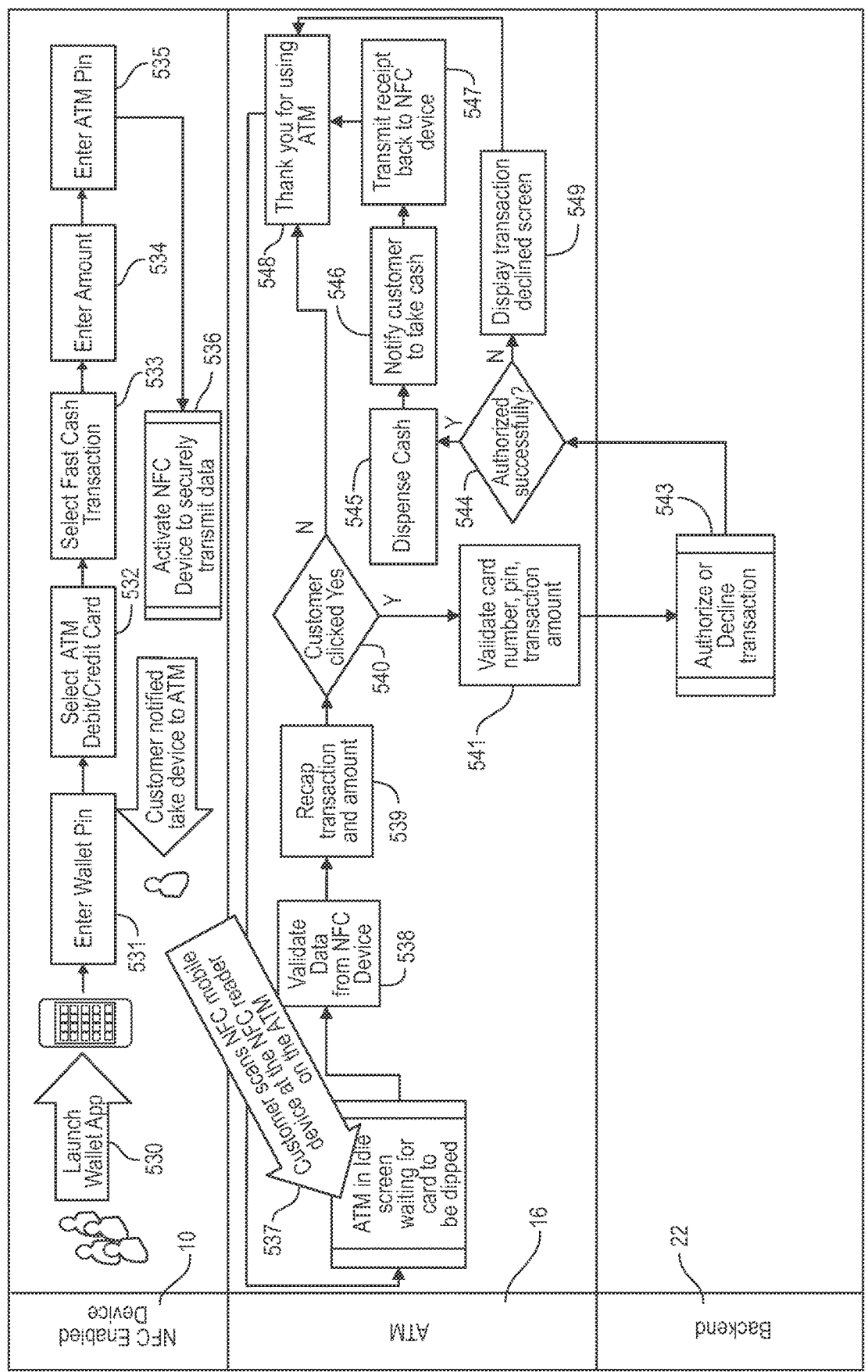
FIG. 3 is a flow chart which illustrates an example of the process of performing a pre-staged cash withdrawal transaction using a mobile communication device with a self-service financial transaction terminal for embodiments of the invention.

FIG. 3 is a flow chart which illustrates an example of the process of performing a pre-staged financial transaction, such as a pre-staged cash withdrawal transaction, using a mobile communication device with a self-service financial transaction terminal for embodiments of the invention. Referring to FIG. 3, at 530 the customer may launch a financial institution wallet application 12 on the customer's NFC-enabled mobile device 10 and at 531, enter, for example, an authorization code or PIN on the wallet application 12. When the customer is authorized by the wallet application, a list of options, such as a financial institution ATM card option, a debit card option, or a credit card option, may be displayed for the customer on a screen of his or her mobile device. Assume, for example, that at 532, the customer selects the debit card option displayed by the wallet application 12. Thereafter, a list of transaction options may be displayed for the customer on the screen of his or her mobile device 10. Assume further, for example, that at 533, the customer selects a "fast cash" transaction. In response to the customer's selection of the "fast cash" transaction, the customer may be prompted by the wallet application 12 to select an amount of cash that the customer wishes to withdraw.

Following the customer's entry at 534 on the wallet application 12 of an amount of cash to withdraw, the customer may be prompted to enter his or her ATM PIN. When the customer enters his or her ATM PIN on the mobile wallet application 12 at 535, the transaction may be deemed to be "pre-staged". At that point, at 536, the customer's mobile device 10 may enter into a "securely transmit data" mode for a pre-determined period of time. That pre-determined period of time represents a window of time within which the customer must locate and approach an NFC-enabled ATM 16 of the financial institution to complete the pre-staged transaction. Otherwise, the window of time lapses and the "securely transmit data mode" may time out.

Assume that, at 537, the customer approaches an NFC-enabled ATM 16 with his or her NFC-enabled mobile device 10 within the "securely transmit mode" window of time and that the ATM screen is idle (i.e., no other customer is using the ATM) and available for use by the customer. Assume further that the customer scans or taps his NFC-enabled mobile device 10, for example, on the NFC card reader panel or sensor 20 of the ATM 16. At that point, the NFC card reader 20 may immediately transact with the NFC chip 12 on the customer's mobile device 10 and receive the data for the pre-staged "fast cash" transaction.

At 538, the processor of the ATM 16 may validate the pre-staged transaction data received from the customer's NFC-enabled mobile device 10. Once the pre-staged transaction data from the NFC-enabled mobile device is validated, at 539, the processor of the ATM 16 may display a recap of the pre-staged transaction for the customer on the ATM screen. The customer may be prompted by the display to confirm that he or she wishes to perform the pre-staged fast cash transaction and the amount of cash he or she wishes to withdraw.

When, at 540, the customer enters his or her confirmation, at 541, the processor of the ATM 16 may send the transaction data with a "validate card number, PIN, and transaction amount" message to the financial institution the back-end or host processor 22. Upon successfully validating the transaction data by the financial institution backend processor 22 at 543, the customer's account may be debited for the amount of cash requested by the customer to be withdrawn, and an authorization message may be sent to the ATM 16 at 544. Upon receipt of the authorization message by the processor of the ATM 16, the requested amount of cash may be dispensed at 545, and a message may be displayed for the customer on the ATM screen instructing the customer to take the cash at 546.

When the customer takes the disbursement of cash from the ATM 16, a message may be displayed for the customer on the ATM screen with an option to have a receipt for the transaction transmitted to the customer's NFC-enabled mobile device 10. The customer may select the option at the ATM 16 to receive a receipt, and at 547 an email an SMS message may be sent to the customer's mobile device 10. Thereafter, at 548, a "thank you" message may be displayed for the customer on the ATM screen, and the ATM 16 may return to the idle state. In the event the transaction is not authorized by the back-end or host processor, a "transaction declined" message may be displayed for the customer on the ATM screen at 549, followed by the "thank you" message at 548, whereupon the ATM 16 returns to the idle state.

It is to be noted that the although the customer's ATM transaction is pre-staged on the customer's NFC-enabled mobile device 10, the transaction may not be authorized until the processor of the ATM 16 sends the "validate card number PIN, and transaction amount" message to the financial institution back-end processor 22 at 541. The "validate card number PIN, and transaction amount" message says, in effect, that the customer is standing in front of the ATM 16 and has scanned his or her NFC-enabled mobile device 10 at the NFC reader 20 of the ATM 16 and wants to perform the transaction that was pre-staged. When the backend or host processor 22 validates the pre-staged transaction data, at 544, it may send an authorization message to the processor of the ATM 16, and the cash is dispensed to the customer at 545.

The backend or host processor 22 may decline the transaction, for example, because the customer previously reported his or her mobile device 10 stolen or his or her card or PIN number compromised. Such decline by the backend or host processor 22 may be automatic and the transaction may not be completed. Thus, embodiments of the invention may include a double authorization. One such authorization may involve entry by the customer of the customer's digital wallet PIN on the customer's mobile device at the beginning of the ATM transaction pre-staging process at 531. The other such authorization may occur at 541 when the "validate card number, PIN, and transaction amount" message is sent by the processor of the ATM 16 to the backend processor 22.

As previously noted, after the customer pre-stages an ATM transaction, the customer's mobile device 10 may enter into a "securely transmit data" mode for a pre-determined period of time within which the customer must locate and approach an NFC-enabled ATM 16 of the financial institution to complete the pre-staged transaction. If the customer fails to complete the pre-staged transaction during that period of time, the "securely transmit data mode" may time out. In that case it may not be necessary for the customer to repeat the pre-staging of the transaction if the customer wishes to resume the transaction at a later time. Instead, the customer may simply re-launch his or her NFC-enabled mobile device wallet application 12 later by again entering the customer's wallet application PIN, which reactivates the pre-staged transaction.

Embodiments of the invention may employ data structures and messages or commands, which embody the data that is communicated, for example, between the NFC chip 14 of a customer's mobile device 10 and the NFC reader 20 of the ATM 16, such that the NFC reader 20 ignores communications from NFC chips that do not support financial institution ATM transactions. For example, if someone attempts to use an unauthorized digital wallet application to emulate the financial institution digital wallet application 12 and send money from a fake credit card, the ATM 16 may recognize that the communication does not come from a financial institution wallet application 12 and that the messages or commands are not correct. In other words, the messages or commands for embodiments of the invention may be unique to the interaction between the financial institution wallet application 12 on the NFC-enabled mobile device 10 and the application stack on the processor of the financial institution ATM 16. Data from the NFC-enabled mobile device 10 to the ATM 16 may have a data structure that includes enabling ATM transactions and encrypting customer data, such as card number, ATM PIN, and transaction data, such as account number and amount.

The data that is communicated from the ATM 16 to the NFC-enabled mobile device 10 may have a data structure that may transmit, for example, an image of a receipt for an ATM transaction and provide an acknowledgment of whether or not the ATM 16 processed the transaction to completion, so that the transaction can be marked as "completed" on the wallet application 12 and will not show up the next time the customer logs in to his or her digital wallet 12. Once a transaction is acknowledged as completed at the ATM 16, the processor of the ATM 16 may send that acknowledgment to the digital wallet 12, which in turn automatically clears the pre-staged transaction on the mobile device 10.

It is to be understood, that embodiments of the invention are not limited to ATM card transactions or transactions with ATMs. It is to be further understood that embodiments of the invention include any and all types and kinds of transactions, including, without limitation, financial transactions, and any and all types and kinds of self-service transaction terminals that enable users to perform transactions, financial or otherwise. For example, an aspect of embodiments of the invention may involve electronic gift cards. In the electronic gift card aspect, instead of mailing paper gift cards and incurring the cost of postage, gift cards may be provided electronically, for example, for customers to give to their friends, families, and relatives. Customers may be allowed to electronically give and recharge gift cards to friends, family, and relatives and load gift cards onto a digital wallet application of their mobile devices. Recipients may use their contactless communication-enabled mobile devices, such as NFC-enabled mobile devices, at a contactless communication-enabled transaction terminal, such as an NFC-enabled ATM, for example, to withdraw cash or check a gift card balance, or to perform any other type of transaction. In addition, the financial institution may support vendors and partners that issue e-gift cards. The recipient of such an e-gift card may load the e-gift card onto his or her digital wallet application on his or her NFC-enabled mobile device and likewise use the e-gift card to perform pre-staged transactions at an NFC-enabled ATM.

Further types of cards which may similarly be loaded and processed according to embodiments of the invention include, without limitation, electronic pre-paid cards, electronic coupons or e-coupons, and electronic cash vouchers or e-vouchers. In other words, according to embodiments of the invention, anything that represents digital value and can be loaded onto a customer's digital wallet application may likewise be used to perform pre-staged transactions, such as dispensing cash, at an NFC-enabled ATM. In addition to pre-staging ATM transactions, such as cash withdrawals, embodiments of the invention may include pre-staging other types of transactions, such as deposits, payment of electronic bills or e-bills, and fund transfers. For example a customer who has signed up with a merchant to receive e-bills may pre-stage a transaction with the e-bill data and transfer funds from the customer's savings or checking account to make an e-bill payment. For another example, the customer may pre-stage a transaction with the e-bill data and deposit cash into the ATM to make the e-bill payment.

A money transfer aspect of embodiments of the invention may employ a functionality, such as POPMONEY$^{SM}$, that allows customers of a financial institution to transfer cash electronically to others, whether or not the recipients are also customers of the same financial institution. In the money transfer aspect, it may not be necessary for the recipient of the electronic funds transfer to have an account with the same financial institution as the sender. Instead, the recipient may simply go to an ATM of the sender's financial institution and withdraw the funds immediately. Neither may it be necessary for the recipient to go to a branch of the sender's financial institution or call someone at the financial institution or to stand in line at the financial institution in order to cash a check for the funds or withdraw the funds. The recipient may simply walk to an NFC-enabled ATM and use funds that were transferred to the electronic wallet of his or her NFC-enabled mobile device using, for example, POPMONEY$^{SM}$ functionality. At the ATM, the recipient may specify an amount of the funds that he or she wishes to withdraw and have that amount of cash dispensed to him or her by the ATM.

Not only is that process convenient for both the sender and the recipient of the funds, but it may also eliminate a need for either the sender or recipient to visit a financial institution branch, which has a cumulative beneficial effect on the financial institution's overhead costs of operating its branches. Further, such process may be an important factor for customer convenience in adapting to new technologies by the financial institution.

A one-time password aspect of embodiments of the invention may supplement existing fraud detection. For example, the financial institution backend may send a message with a one-time-password, for example, via SMS or other suitable telecommunication means to the digital wallet application on the customer's NFC-enabled mobile device. Thereafter, when the customer pre-stages an ATM transaction and takes his or her NFC-enabled mobile device to an ATM and scans it at the NFC reader, the one-time password may be included in the transaction data and passed with the transaction data to the financial institution backend processor, which may recognize the one-time-password as valid for the customer's ATM transaction. It is to be noted that provision of the one-time-password by the financial institution to the wallet application on the customer's mobile device and inclusion with the transaction data in a subsequent pre-staged ATM transaction may be transparent to the customer, as well as to any unauthorized person.

Alternative aspects of embodiments of the invention may involve, for example, a physical communication connection between the customer's mobile device and the self-service transaction terminal. In such aspects, a Mobile Device such as a Smartphone or Tablet or any such hand-held device may be used to physically connect to the ATM that is equipped with a suitable physical connection end point. Such end points are USB (all types—A, B, Mini-A, Mini-B, Micro-A and Micro-B), COM RS232, Apple port connector etc. provided at the ATM for customers to plug in their device to transact with the ATM. Transactions may be pre-staged on the device and upon connection with the ATM through the physical connector, the ATM and the device may start interfacing with flow of relevant data and authorization between the ATM and the mobile device. The physical communication may be used to transmit data such successful connection between the device and the ATM, authentication of the device by the ATM for identification and security purposes, transmission of the data from the mobile Citi application on the device to the ATM, progress or status notification of the transaction at the ATM and a record of completion of transaction back to the device.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices

What is claimed is:

1. A method, comprising:
transmitting, by a backend host processor coupled to memory, a one-time password to a processor coupled to memory of a mobile computing device of a user transparent to the user;
receiving, by a mobile computing device, entry of pre-staged transaction data from the user before an engagement with a self-service financial transaction terminal;
storing, by the mobile computing device, the pre-staged transaction data and the one-time password;
activating, by the mobile computing device, a wireless communication technology to communicate the pre-staged transaction data and the one-time password to a self-service financial transaction terminal processor associated with the self-service financial transaction terminal such that the user is not required to enter data on a user interface of the self-service financial transaction terminal;
receiving, by the self-service financial transaction terminal processor coupled to memory, pre-staged transaction data and said one-time password included with said pre-staged transaction data transparent to the user in a session with the mobile computing device at the self-service financial transaction terminal within a predetermined securely transmit data time-out period commencing at a time when the pre-staged transaction data is entered on the processor coupled to memory of the mobile computing device before the mobile computing device processor is in communication with the self-service financial transaction terminal processor;
transmitting, by the self-service financial transaction terminal processor, said pre-staged transaction data and said one-time password included with said transmitted pre-staged transaction data transparent to the user to said backend host processor;
validating, by the backend host processor, said one-time password for a transaction with the pre-staged transaction data;
executing, by the self-service financial transaction terminal processor, the transaction based at least in part on the pre-staged transaction data;
transmitting, by the self-service financial transaction terminal processor, an image of a receipt acknowledging execution of the transaction based at least in part on the pre-staged transaction data to completion to the processor of the mobile computing device via email or Short Message Service; and
receiving, by the processor of the mobile computing device, the transmittal of the receipt acknowledging execution to completion of the transaction based at least in part on the pre-staged transaction data;
marking, by the processor of the mobile computing device, the transaction as completed in memory of the mobile computing device in response to receiving the transmittal of the receipt acknowledging execution to completion of the transaction based at least in part on the pre-staged transaction data;
clearing, by the processor of the mobile computing device, the pre-staged transaction data stored in memory of the mobile computing device in response to receiving the transmittal of the receipt acknowledging execution to completion of the transaction based at least in part on the pre-staged transaction data; and
making, by the processor of the mobile computing device, the transaction unavailable for display on the mobile computing device after said clearing in response to receiving the transmittal of the receipt acknowledging execution to completion of the transaction based at least in part on the pre-staged transaction data;
wherein executing the transaction further comprises dispensing a transaction amount from the self-service financial transaction terminal.

2. The method of claim 1, wherein receiving the pre-staged transaction data further comprises receiving the pre-staged transaction data from an application executing on the mobile computing device processor.

3. The method of claim 1, wherein receiving the pre-staged transaction data further comprises receiving the pre-staged transaction data from a digital wallet application executing on the mobile computing device processor.

4. The method of claim 1, wherein the mobile computing device further comprises a mobile communication device.

5. The method of claim 1, wherein receiving the pre-staged transaction data further comprises receiving a digital wallet application personal identification number from a digital wallet application executing on the mobile computing device processor.

6. The method of claim 5, wherein receiving the pre-staged transaction data further comprises receiving a selection of a transaction card account for the transaction from the digital wallet application executing on the mobile computing device processor.

7. The method of claim 6, wherein receiving the pre-staged transaction data further comprises receiving a selection of a transaction type from the digital wallet application executing on the mobile computing device processor.

8. The method of claim 7, wherein receiving the pre-staged transaction data further comprises receiving a transaction amount from the digital wallet application executing on the mobile computing device processor.

9. The method of claim 8, wherein receiving the pre-staged transaction data further comprises receiving a self-service financial transaction terminal personal identification number from the digital wallet application executing on the mobile computing device processor.

10. The method of claim 1, wherein receiving the pre-staged transaction data at the self-service financial transaction terminal further comprises receiving the pre-staged transaction data at the self-service financial transaction terminal via a contactless communication interface.

11. The method of claim 10, wherein receiving the pre-staged transaction data via the contactless communication interface further comprises receiving the pre-staged transaction data at the self-service financial transaction terminal via a contactless communication device associated with the mobile computing device.

12. The method of claim 11, wherein receiving the pre-staged transaction data via the contactless communication interface further comprises receiving the pre-staged transaction data at the self-service financial transaction terminal via an activated contactless communication device associated with the mobile computing device.

13. The method of claim 12, wherein receiving the pre-staged transaction data via the activated contactless communication device further comprises receiving the pre-staged transaction data via an activated near field communication device securely transmitting the transaction data.

14. The method of claim 13, wherein receiving the pre-staged transaction data via the activated near field communication device further comprises receiving the pre-staged transaction data via the activated near field communication device within a pre- determined securely transmit data timeout period.

15. The method of claim 14, wherein receiving the pre-staged transaction data via the activated near field communication device further comprises receiving the pre-staged transaction data via the activated near field communication device which is activated to interact with the processor of the self-service financial transaction terminal when the activated near field communication device is in proximity to a near field communication reader associated with the self-service financial transaction terminal.

16. The method of claim 1, wherein receiving the pre-staged transaction data at the self-service financial transaction terminal further comprises receiving the pre-staged transaction data at the self-service financial transaction terminal via a physical connection communication interface.

17. The method of claim 1, wherein executing the transaction further comprises executing the transaction based at least in part on the pre-staged transaction data received from the mobile computing device via a contactless communication device associated with the mobile computing device.

18. The method of claim 17, wherein executing the transaction based at least in part on the pre-staged transaction data received from the mobile computing device via the contactless communication device further comprises executing the transaction based at least in part on the pre-staged transaction data received from the mobile computing device via a contactless communication reader associated with the self-service financial transaction terminal.

19. The method of claim 1, wherein executing the transaction further comprises validating the transaction data by the self-service financial transaction terminal processor.

20. The method of claim 19, wherein executing the transaction further comprises sending the validated transaction data from the self-service financial transaction terminal to a host processor for authorization.

21. The method of claim 20, wherein executing the transaction further comprises sending a message authorizing the transaction from the host processor to the self- service financial transaction terminal.

22. A system, comprising:
a backend host processor coupled to memory and programmed to:
transmit a one-time password to a processor coupled to memory of a mobile computing device of a user transparent to the user;
a self-service financial transaction terminal processor associated with a self-service financial transaction terminal and coupled to memory, wherein the self-service financial transaction terminal processor is programmed to:
receive pre-staged transaction data and said one-time password included with said pre-stage transaction data transparent to the user in a session with the mobile computing device at the self-service financial transaction terminal within a pre-determined securely transmit data time-out period commencing at a time the pre-staged transaction data is entered on the processor coupled to memory of the mobile computing device before the mobile computing device processor is in communication with the self-service financial transaction terminal processor, said pre-staged transaction data and said one-time password being stored in memory of the mobile computing device by the processor of the mobile computing device;
transmit said pre-staged transaction data and said one-time password included with said transmitted pre-stage transaction data transparent to the user to said backend host processor;
said backend host processor being further programmed to:
validate said one-time password for a transaction with the pre-staged transaction data;
said self-service financial transaction terminal processor being further programmed to:
execute a transaction based at least in part on the pre-staged transaction data;
transmit an image of a receipt acknowledging execution of the transaction based at least in part on the pre-staged transaction data to completion to the processor of the mobile computing device via email or Short Message Service;
the processor of the mobile computing device being programmed to:
receive entry of the pre-staged transaction data from the user before an engagement with the self-service financial transaction terminal;
store the pre-staged transaction data and the one-time password, the one-time password transparent to the user;
activate a wireless communication technology to communicate the pre-staged transaction data and the one-time password to the self-service financial transaction terminal processor associated with the self-service financial transaction terminal such that the user is not required to enter data on a user interface of the self-service financial transaction terminal;
receive the transmittal of the receipt acknowledging execution to completion of the transaction based at least in part on the pre-staged transaction data;
mark the transaction as completed in memory of the mobile computing device in response to receiving the transmittal of the receipt acknowledging execution to completion of the transaction based at least in part on the pre-staged transaction data;
clear the pre-staged transaction data stored in memory of the mobile computing device in response to receiving the transmittal of the receipt acknowledging execution to completion of the transaction based at least in part on the pre-staged transaction data; and
make the transaction unavailable for display on the mobile computing device after said clearing in response to receiving the transmittal of the receipt acknowledging execution to completion of the transaction based at least in part on the pre-staged transaction data;
wherein executing the transaction further comprises dispensing a transaction amount from the self-service financial transaction terminal.

* * * * *